United States Patent Office 3,574,512
Patented Apr. 13, 1971

3,574,512
PROCESS FOR THE CONTINUOUS DYEING OF ARTICLES MADE OF POLYACRYLONITRILE OR COPOLYMERS CONTAINING ACRYLONITRILE
Johann Weber, deceased, late of Cologne-Flittard, Germany, by Helene Weber, heir and legal representative of minor heirs, Kohlscheid-Bank, and Rutger Neeff, Leverkusen, Germany, assignors to Farbenfabriken Bayer Aktiengesellschaft, Leverkusen, Germany
No Drawing. Filed Nov. 1, 1968, Ser. No. 773,979
Claims priority, application Germany, Nov. 11, 1967, P 16 19 550.9; Nov. 29, 1967, P 16 19 552.1
Int. Cl. D06p 3/76
U.S. Cl. 8—4                                    11 Claims

ABSTRACT OF THE DISCLOSURE

Process for continuous dyeing of articles of polyacrylonitrile or copolymers containing at least 80% acrylonitrile by impregnating said articles with an aqueous liquor containing cationic dyestuffs and at least one partially or completely hydrogenated thiophen-1,1-dioxide compound.

---

The present invention relates to a process for the continuous dyeing of articles made of polyacrylonitrile or copolymers of acrylonitrile by impregnation with an aqueous liquor containing cationic dyestuffs and subsequent thermal treatment; more particularly it concerns a process wherein the aqueous dyebath serving for impregnation contains compounds carrying at least one partially or completely hydrogenated thiophen-1,1-dioxide group.

The compounds to be used according to the invention, which contain at least one partially or completely hydrogenated thiophen-1,1-dioxide group include, in particular, compounds corresponding to the Formulae A, B and C

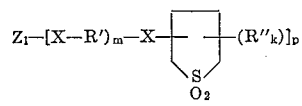
(A)

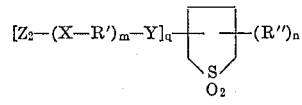
(B)

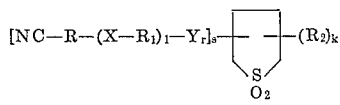
(C)

In the partially hydrogenated thiophen-1,1-dioxide groups the double bond may be in the α- or β-position to the sulphone group.

In the formulae the symbols have the following meaning:

$m$ is a number from 0 to 5,
$n$ is a number from 0 to 4,
$p$ is a number from 1 to 8,
$q$ is a number from 0 to 4,
$l$ is 0 or 1,
$k$ is a number from 0 to 3,
$s$ is a number from 1 to 4,
$r$ is 0 or 1,
X and Y, independently of one another, are oxygen or sulphur;
R' is a bivalent organic radical, preferably a lower alkylene radical which may be substituted by hydroxy, alkoxy or alkyl mercapto groups or by halogen; if a molecule contains several radicals R', these may be different;
R" is a hydrocarbon radical which is linked via a single or double bond and may be substituted by alkyl, hydroxy, alkoxy, amino, carboxyl or carbonamide groups or by halogen; an annellated carbocycle or heterocycle; a halogen atom; a functional organic group linked via a single or double bond; an oxygen or sulphur atom; if a molecule contains several radicals R", these may be different;
$Z_1$ is the radical of a polyfunctional compound in which one or more functional groups may be replaced with the grouping

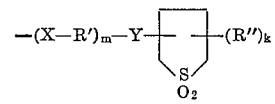

$Z_2$ is a bivalent organic radical, for example a saturated or unsaturated alkyl radical with 1 to 20 carbon atoms, which my be substituted by hydroxy, alkoxy or halogen; a cycloalkyl radical which may be substituted by alkyl or alkoxy; an aralkyl or hetero-aralkyl radical which may be substituted by alkyl; an aryl or hetero-aryl radical which may be substituted by halogen, cyanogen or alkoxy; an acyl group which may be substituted by hydroxy, alkoxy, halogen or cyanogen; or a di- or tetrahydrothiophen-1,1-dioxide radical which may be substituted by alkyl or halogen; if a molecule contains several radicals $Z_2$, these may be different;
R is a lower alkylene radical;
$R_1$ is an alkylene radical with not more than 8 carbon atoms, which may be substituted by hydroxy, alkoxy or cyanoalkoxy groups and the carbon chain of which may be interrupted by nitrogen, oxygen or sulphur;
$R_2$ is a hydrocarbon radical which is linked via a single or double bond and may be substituted by alkyl, hydroxy, alkoxy, amino, mercapto, cyano, carboxylic ester or carbonamide groups; an annellated carbocycle or heterocycle; a halogen atom; a functional organic group linked via a single or double bond; an oxygen or sulphur atom; if a molecule contains several radicals R, $R_1$ or $R_2$, these may be different.

R': Examples of bivalent radicals R' are the methylene, ethylene, propylene, isopropylene, 2-hydroxypropylene, 2-methoxy-propylene, 2-butylmercapto-propylene and 2-chloropropylene radicals.

R": The following groups are suitable for R" as optionally substituted hydrocarbon radicals linked via a single bond: alkyl groups, especially those with 1–6 carbon atoms, such as the methyl, ethyl, isopropyl or pentyl groups; substituted alkyl groups, such as the trichloromethyl, methoxymethyl, hydroxymethyl, acetaminomethyl, carbamidomethyl or carboxymethyl groups; or cycloalkyl, aralkyl and aryl groups, for example, the cyclohexyl, benzyl or phenyl group.

Examples of hydrocarbon radicals linked via a double bond are the alkylidene and aralkylidene radicals, for example, the methylidene, ethylidene, propylidene, isopropylidene, butylidene, benzylidene, p-chlorobenzylidene, m-methoxybenzylidene, o-nitrobenzylidene, p-cyanobenzylidene, or o-cyanobenzylidene radicals; furthermore, alkyl-, aralkyl- or aryl-azomethine radicals, such as the methyl-, ethyl-, phenyl-, p-cyanophenyl- or m-bromophenyl-azomethine radical.

Examples of carbocycles which may be annellated to the hydrogenated thiophen-1,1-dioxide are: aromatic rings, such as the benzene or naphthalene ring, which may be substituted by alkyl, alkoxy or halogen; and cycloaliphatic 5- and 6-membered rings, such as the cyclohexyl or cyclopentyl ring, which may be substituted by alkyl, hydroxy, alkoxy, acyloxy or cyano groups or by halogen.

Suitable heterocycles which may be annellated to the hydrogenated thiophen-1,1-dioxide are: the hetero-aromatic 5- or 6-membered rings, such as the furan, thiophen, pyrrole, oxazole, thiazole, imidazole, α- or β-pyrone, pyridine, 1,4-dithiine, 1,4-oxathiine, pyrimidine or pyrazine rings; furthermore, the oxirane, thiirane or aziridin ring.

Suitable halogen atoms are chlorine, bromine or iodine.

Suitable functional organic groups linked via a single bond are, for example, carbonamide groups, such as the N,N-dimethyl-carbamide, N-methyl-carbamide, N-methyl-N-butyl-carbamide groups; acylamino groups, such as the formylamino, acetylamino, lauroylamino or benzoylamino groups; and acyl radicals, such as the formyl, acetyl or benzoyl radical; furthermore, hydroxy, mercapto and cyano groups.

Suitable functional organic groups linked via a double bond are, for example, oxime groups which may be alkylated, e.g. methylated or ethylated; aralkylated, e.g. benzylated; or acylated, e.g. formylated, acetylated or benzoylated.

$Z_1$: Radicals or polyfunctional compounds suitable for $Z_1$ are, in particular, those radicals which contain, as functional groups, hydroxyl groups; alkoxy groups, such as methoxy, ethoxy or butoxy groups; or acyloxy groups, such as formyloxy or acetoxy groups; furthermore carboxyl, carbonamide or carboxylic ester groups, or halogen atoms, such as fluorine, chlorine or bromine. Examples of radicals of compounds containing such functional groups are the radicals of polyhydric alcohols, such as ethylene-glycol, 1,2-propylene-glycol, 1,3-propylene-glycol, 1,4-butylene-glycol, 1,6-hexylene-glycol, glycerol, 2,2-bis-(hydroxymethyl) - 1 - propanol-(1), 2,2-bis-(hydroxymethyl)-butanol-(1), 2,2-bis-(hydroxymethyl)-pentanol-(1), butane-triol-(1,2,4), hexane-triol-(1,2,6), pentaerythritol, sorbitol, glucose, saccharose and polyvinyl alcohols with up to 50 vinyl alcohol units; of polyvalent phenols, such as pyrocatechol, resorcinol, hydroquinone, phloro-glucinol, hydroxyhydroquinone and pyrogallol; furthermore, of hetero-aromatic polyhydroxy compounds, such as 2,4-dihydroxy-quinoline, 2,3-dihydroxy-quinoxaline and 2,4,6-trihydroxy-triazine-(1,3,5).

$Z_2$: Suitable monovalent organic radicals $Z_2$ are optionally substituted, saturated or unsaturated alkyl radicals with 1 to 20 carbon atoms, for example, the methyl, ethyl, propyl, isopropyl, n-butyl, isobutyl, amyl, isoamyl, n-hexyl, 2,2-dimethylhexyl-(1), octadecyl, octadec-9-enyl-(1), 3-methoxybutyl-(1), trichloromethyl, 2-hydroxyethyl, 2-chloroethyl, propinyl, but-2-enyl-(1), 3-chloropentyl-(1) and 8-bromononyl-(1) radical; furthermore, the cyclohexylmethyl, β-cyclohexylethyl, γ-cyclohexylpropyl, pyrrolidonyl-N-methyl, β-pyrrolidonyl-N-ethyl or γ-pyrrolidonyl-N-propyl radicals; optionally substituted cycloalkyl radicals are, for example, the cyclopentyl, 3 - methyl-cyclopentyl, cyclohexyl, 4 - methylcyclohexyl, 3,3,5-trimethylcyclohexyl, 4-tert-butyl-cyclohexyl, 4-methoxycyclohexyl and 3,5-dimethoxycyclohexyl radicals; optionally substituted aralkyl or hetaralkyl radicals are, for example, the benzyl, β-phenylethyl, γ-phenylpropyl, β-pyrazolyl-N-ethyl, β-2,4-dimethyl-pyrazolyl - N - ethyl, pyridyl-2-methyl, thienyl-2-methyl, pyrrylmethyl and imidazolyl-methyl radical; optionally substituted aryl radicals are, for example, the phenyl, 2,4-dichlorophenyl, pentachlorphenyl, p-cyanophenyl, m-methoxyphenyl, α-naphthyl, β-naphthyl and o-bromophenyl radicals; optionally substituted hetaryl radicals are, for example, the thienyl, pyrryl, imidazolyl, pyridyl, pyrazolyl, pyridazyl, pyrimidyl and dioxazolyl radicals; optionally substituted acyl radical are, for example, the formyl, acetyl, propionyl, butyryl, α-hydroxybutyryl, chloroacetyl, δ-methoxyvaleroyl, benzoyl and p-cyanobenzoyl radicals; and optionally substituted di- or tetrahydrothiophen-1,1-dioxide radicals are, for example, the 4-hydroxy-tetrahydro-1,1-dioxothienyl-(3), 4 - chlorotetrahydro-1,1-dioxothienyl-(3), 3-methyl-tetrahydro-1,1-dioxo-thienyl - (3), tetrahydro-1,1-dioxo-thienyl-(3), 2,3 - dihydro-1,1-dioxothienyl-(4) or 3-methyl-2,3-dihydro-1,1-dioxo-thieny-(3) radicals.

Lower alkylene radicals R are, for example, $C_1$–$C_3$-alkylene radicals, such as the methylene, ethylene, propylene or isopropylene radical.

Examples of alkylene radicals $R_1$ are: the methylene, ethylene, propylene, isopropylene, 2-hydroxypropylene, 2-methoxypropylene, 2-(β-cyanoethoxy)-propylene, 2-β-cyano-ethylmercapto-butylene - (1,4), 2-β-cyanoethoxy-hexylene-(1,6), 3-oxa-pentylene-(1,5), 3-thiapentylene-(1,5), 3-dioxy-3-thiapentylene-(1,5), 3-acetyl-3-azapentylene-(1,5) or 3-cyanoethyl-3-azapentylene-(1,5) radicals; furthermore, the 2,2-bis-[2'-(tetrahydro-1'',1''-dioxo-thienyl-3''-oxy) - ethoxymethyl] - 4 - oxa-hexylene-(1,6) and 2-ethyl-2-[2'-(tetrahydro-1'',1''-dioxo-thienyl-3''-oxy)ethoxymethyl]-4-oxa-hexylene-(1,6) radicals.

The following groups are suitable for $R_2$ as optionally substituted hydrocarbon radicals linked via a single bond:

Alkyl groups, especially those with 1-6 carbon atoms, such as the methyl, ethyl, isopropyl, or pentyl group; substituted alkyl groups, such as the trichloromethyl, methoxymethyl, hydroxy-methyl, acetaminomethyl, β-cyanoethoxymethyl, β-cyanoethylaminomethyl, N,N-bis-(β-cyanoethyl-)carbamidomethyl, carbamidomethyl or carboxy-methyl group; or cycloalkyl, aralkyl and aryl groups, e.g. the cyclohexyl, benzyl or phenyl group.

The hydrocarbon radicals linked via a double bond include alkylidene and aralkylidene radicals, e.g. the methylidene, ethylidene, propylidene, isopropylidene, butylidene, benzylidene, p-chlorobenzylidene, m-methoxybenzylidene, o-nitrobenzylidene, p-cyanobenzylidene or o-cyanobenzylidene radicals; furthermore, alkyl, aralkyl or aryl-azomethine radicals, such as the methyl-, ethyl-, phenyl-, p-cyanophenyl- or m-bromophenyl-azomethine radical.

Examples of carbocycles which may be annellated to the hydrogenated thiophen-1,1-dioxide are: aromatic rings, such as the benzene or naphthalene ring, which may be substituted by alkyl, alkoxy or halogen; and cycloaliphatic 5- and 6-membered rings, such as the cyclohexyl or cyclopentyl ring, which may be substituted by alkyl, hydroxy, alkoxy, acyloxy or cyano groups or by halogen.

Suitable heterocycles which may be annellated to the hydrogenated thiophen-1,1-dioxide are the heteroaromatic 5- or 6-membered rings, such as the furan, thiophen, pyrrole, oxazole, thiazole, imidazole α- or γ-pyrone, pyridine, 1,4-dithiine, 1,4-oxathiine, pyrimidine or pyrazine ring; furthermore, oxiran, thiiran or aziridine rings.

Suitable halogen atoms are chlorine, bromine or iodine.

Functional organic groups linked via a single bond are, for example, carbonamide groups, such as the N,N-dimethylcarbamide, N-methylcarbamide, N-β-cyanoethylcarbamide, N,N-bis-β-cyanoethylcarbamide, N-methyl-N-butyl-carbamide groups; substituted amino groups, such as the β-cyanoethylamino, N,N-bis-β-cyanoethylamine, acetylamino, N-β-cyanoethyl - acetylamino, propionylamino, butyrylamino, laurolyamino or benzoylamino groups; and acyl radicals, such as the formyl, acetyl or benzoyl radicals; furthermore, hydroxy, mercapto and cyano groups.

Functional organic groups linked via a double bond are, for example, oxime groups which may be alkylated, e.g. methylated or ethylated; aralkylated, e.g. benzylated; or acylated, e.g. formylated, acetylated or benzoylated.

Of the compounds corresponding to the Formula A, there may be mentioned, in particular, those of the formulae (A1)

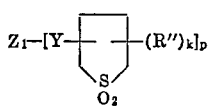

(A2)

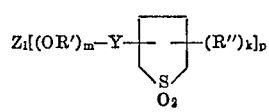

and (A3)

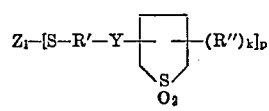

and of the compounds corresponding to the Formula B, in particular those of the formulae (B1)

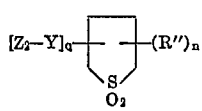

(B2)

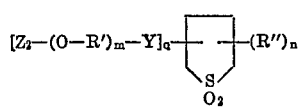

and (B3)

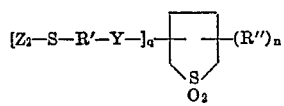

in all compounds, the thiophen-1,1-dioxide groups are again partially or completely hydrogenated.

Compounds to be used according to the invention are, for example:

3-ethyl-tetrahydrothiophen-1,1-dioxide,
2,3-dimethyl-tetrahydrothiophen-1,1-dioxide,
3-methyl-2,3-dihydrothiophen-1,1-dioxide,
2-isopropyl-5-methyl-2,3-dihydrothiophen-1,1-dioxide,
1-isopropenyl-5-methyl-5-ethyl-tetrahydrothiophen-1,1-dioxide,
3-ethoxymethyl-2,5-dihydrothiophen-1,1-dioxide,
4-phenyl-2,3-dihydrothiophen-1,1-dioxide,
3-methyl-4-cyano-2,5-dihydrothiophen-1,1-dioxide,
3-chloro-2,5-dihydrothiophen-1,1-dioxide,
4-chloro-2,3-dihydrothiophen-1,1-dioxide,
3,4-dichloro-tetrahydrothiophen-1,1-dioxide,
3-hydroxy-2,3-dihydrothiophen-1,1-dioxide,
3-carbamido-tetrahydrothiophen-1,1-dioxide,
3-carbomethoxy-tetrahydrothiophen-1,1-dioxide,
3-acetamino-tetrahydrothiophen-1,1-dioxide,
3,4-bis-methylene-tetrahydrothiophen-1,1-dioxide,
2-methyl-2-ethyl-5-isopropylidene-tetrahydrothiophen-1,1-dioxide,
2,5-bis(p-methoxybenzylidene)-2,5-dihydrothiophen-1,1-dioxide,
3,4-epoxy-tetrahydrothiophen-1,1-dioxide,
2,2-dimethyl-4,5-(3',4'-tetrahydro-1'-dioxo-thiopheno)-oxazolidine, 3a,7a-dihydrobenzothiophen-1,1-dioxide,
3,3a-dichloro-3a,4,7,7a-tetrahydro-4,7-methano-thianaphthene-1,1-dioxide,
3-benzamido-tetrahydrothiophen-1,1-dioxide,
3-lauramido-tetrahydrothiophen-1,1-dioxide,
3-(decyloxy)-tetrahydrothiophen-1,1-dioxide,
3-(octadecyloxy)-tetrahydrothiophen-1,1-dioxide,
3-(octadec-9-enyloxy)-tetrahydrothiophen-1,1-dioxide,
3-(2'-hydroxyethoxy)-tetrahydrothiophen-1,1-dioxide,
3-(2'-chloroethoxy)-tetrahydrothiophen-1,1-dioxide,
3-(4'-methoxycyclohexyloxy)-tetrahydrothiophen-1,1-dioxide,
3-phenoxy-tetrahydrothiophen-1,1-dioxide,
3-[β-(2',4'-dimethyl-pyrazoyl-(1)-ethoxy)]-tetrahydrothiophen-1,1-dioxide,
3-(p-cyano-phenoxy)-tetrahydrothiophen-1,1-dioxide,
3-(2',4'-dichlorophenoxy)-tetrahydrothiophen-1,1-dioxide,
3-(o-methoxyphenoxy)-tetrahydrothiophen-1,1-dioxide,
3-acetoxy-tetrahydrothiophen-1,1-dioxide,
3,4-dimethoxy-tetrahydrothiophen-1,1-dioxide,
3-benzoyloxy-tetrahydrothiophen-1,1-dioxide,
3-butyryloxy-tetrahydrothiophen-1,1-dioxide,
3,4-bis-(2'-methoxy-ethoxy)-tetrahydrothiophen-1,1-dioxide,
3-(2'-β-hydroxyethoxy-ethoxy) tetrahydrothiophen-1,1-dioxide,
3-[2'-(3'',3'',5''-trimethyl-cyclohexyloxy)-ethoxy]-tetrahydrothiophen-1,1-dioxide,
3,4-bis(2'-hydroxyethoxy)-tetrahydrothiophen-1,1-dioxide,
3-(2'-benzylmercapto-ethoxy)-tetrahydrothiophen-1,1-dioxide,
3-[2'-(2''-phenoxy-ethoxy)-ethoxy]-tetrahydrothiophen-1,1-dioxide,
3-[2'-(2''-benzyloxy-ethoxy)-ethoxy]-tetrahydrothiophen-1,1-dioxide,
2-methyl-4-methoxy-tetrahydrothiophen-1,1-dioxide,
3-methyl-3-benzylmercapto-tetrahydrothiophen-1,1-dioxide,
3-methyl-3-n-butoxy-tetrahydrothiopen-1,1-dioxide,
2-methyl-3-(2'-ethoxy-ethoxy)-tetrahydrothiophen-1,1-dioxide,
3-methoxy-4-cyano-tetrahydrothiophen-1,1-dioxide,
3-n-butoxy-4-methoxy-tetrahydrothophen-1,1-dioxide,
2-methyl-4-benzylmercapto-tetrahydrothiophen-1,1-dioxide,
3-chloro-4-methyl-mercapto-tetrahydrothiophen-1,1-dioxide,
3-chloro-4-ethylmercapto-tetrahydrothiophen-1,1-dioxide,
3-chloro-4-phenylmercapto-tetrahydrothiophen-1,1-dioxide,
3-benzylmercapto-tetrahydrothiophen-1,1-dioxide,
3-(2',3'-dihydroxypropylmercapto)-tetrahydrothiophen-1,1-dioxide,
3-allylmercapto-tetrahydrothiophen-1,1-dioxide,
3-(p-chlorobenzylmercapto)-tetrahydrothiophen-1,1-dioxide,
3-(p-methoxybenzyl-mercapto)-tetrahydrothiophen-1,1-dioxide,
3-methylmercapto-2,5-dihydrothiophen-1,1-dioxide,
4-ethylmercapto-2,3-dihydrothiophen-1,1-dioxide,
3-n-butylmercapto-2,3-dihydrothiophen-1,1-dioxide,
4-n-butylmercapto-2,3-dihydrothiophen-1,1-dioxide,
3-benzylmercapto-2,3-dihydrothiophen-1,1-dioxide,
3-benzylmercapto-2,3-dihydrothiophen-1,1-dioxide,
4-benzylmercapto-2,3-dihydrothiophen-1,1-dioxide,
3-n-propylmercapto-tetrahydrothiophen-1,1-dioxide,
3-n-propylmercapto-2,3-dihydrothiophen-1,1-dioxide,
3,4-bis-(acetylmercapto)-tetrahydrothiophen-1,1-dioxide,
3-(2'-hydroxypropylmercapto)-tetrahydrothiophen-1,1-dioxide,
3-[2'-<2''(2'''-hydroxy-propoxy)-propoxy>propylmercapto]-tetrahydrothiophen-1,1-dioxide,
3-[2'-hydroxy-3'-(2'',4''-dichlorophenoxy)-propoxy]-tetrahydrothiophen-1,1-dioxide,
3-[2'-<2''-(tetrahydro-1''',1'''-dioxo-thienyl-3'''-oxy)-ethoxy>-ethylmercapto]-tetrahydrothiophen-1,1-dioxide,
1,2-bis(tetrahydro-1',1'-dioxo-thienyl-3'-mercapto)-ethane,
tetrakis[2-(tetrahydro-1',1'-dioxo-3'-methyl-thienyl-3'-oxy)-ethoxymethyl]-methane,
2,4,6-tris(tetrahydro-1',1'-dioxo-thienyl-3'-mercapto)-triazine-(1,3,5), 2,4,6-tris[2'-(tetrahydro-1",1"-dioxo-thienyl-3"-mercapto)-ethoxy]-triazine-(1,3,5),
2,4-bis-(2'-methoxy-ethoxy)-6-(tetrahydro-1',1'-dioxo-thienyl-3'-mercapto)-triazine-(1,3,5),
3-(N-morpholino)-tetrahydrothiophen-1,1-dioxide,
3-(3'-methoxy-butyl)-tetrahydrothiophen-1,1-dioxide,
3-[2'-(β-hydroxy-ethylmercapto)-ethoxy]-tetrahydrothiophen-1,1-dioxide,
3-(3'-methoxy-butyl)-tetrahydrothiophen-1,1-dioxide,
3-(2'-benzyloxy-ethylmercapto)-tetrahydrothiophen-1,1-dioxide,
3-acetyl-tetrahydrothiophen-1,1-dioxide,
3-(cyclohex-2'-enyloxy)-tetrahydrothiophen-1,1-dioxide,
3-(cyclohex-3'-enyloxy)-tetrahydrothiophen-1,1-dioxide,
3-(cyclohexydienyloxy)-tetrahydrothiophen-1,1-dioxide,
1,4-bis(tetrahydro-1',1'-dioxo-thienyl-3'-mercapto) butene-(2),
1,4-bis(tetrahydro-1',1'-dioxo-thienyl-3'-mercapto) butene-(2),
tetrahydro-1,1-dioxo-thienyl-(3)-phohphonic acid diethyl ester, tetrahydro-1,1-dioxo-thienyl-(3)-phosphoric acid dicyclohexyl ester,
O,O-diethyl-S-(tetrahydro-1,1-dioxo-thienyl-2)-dithiophosphoric acid ester,
2-phenylmercapto-3-chloro-tetrahydrothiophen-1,1-dioxide,
N-(tetrahydro-1',1'-dioxo-thienyl-3'-oxy-methyl)-pyrrolidone-(2),
2,2-bis(prop-2'-enyloxy-methyl)-1-(tetrahydro-1",1"-dioxo-thienyl-3"-oxy)-butane.

Others representative of the compounds to be used according to the invention are mentioned in the examples.

The compounds to be used according to the invention can be prepared in known manner by various methods, for example, by a base-catalysed addition of alcohols, mercaptans or amines on to thiophen- or 2,5-dihydro-thiophen-1,1-dioxides; or by the addition of sodium hydrogen sulphide on a 2,5-dihydrothiophen-1,1-diioxide and subsequent alkylation or acylation of the resultant mercaptans; or by the reaction of 1 mole of a 3,4-dichloro-tetrahydrothiophen-1,1-dioxide with 2 mols alkali metal alcoholate or alkali metal mercaptide; or by the reaction of 2,3-dichloro-tetrahydrothiophen-1,1-dioxide with alkali metal mercaptides; furthermore, by the reaction of 3,4-epoxytetrahydrothiophen-1,1-dioxide with hydrogen sulphide; by condensation of 2,5-dihydrothiophen-1,1-dioxide with carbonyl compounds, e.g. ketones; furthermore, by a base-catalysed addition of acrylonitrile on to di- or tetrahydrothiophen-1,1-dioxides containing amino, hydroxy or mercapto groups, or by the reaction of chloromethyl compounds of di- or tetrahydrothiophen-1,1-dioxide with hydroxy- or mercapto-alkylnitriles.

Suitable cationic dyestuffs are dyestuffs of the most varied classes of compounds, for example, diphenyl-methane, triphenyl-methane and rhodamine dyestuffs, azo and anthraquinone dyestuffs containing onium groups; furthermore, thiazine, oxazine, methine and azomethine dyestuffs as are described, for example, in "American Dyestuff Reporter" (1954), pages 432–433; U.S. patent specification No. 2,716,655; and Britist patent specifications Nos. 785,988 and 791,932.

The necessary amounts of compounds containing thiophen-1,1-dioxide groups as are to be used according to the invention can easily be ascertained by preliminary experiments. In general, amounts of 20 to 200%, preferred to the weight of the dyestuffs used, have proved satisfactory, but the concentration of the compounds to be used according to the invention in the impregnating liquors should amount to at least 1 percent by weight.

If the compounds containing thiophen-1,1-dioxide groups as are to be used according to the invention are not sufficiently water soluble, it has proved to be advantageous to disperse them, prior to use, by the addition of suitable dispersing agents, such as oleic acid ethanolamide or ethoxylation products of oleyl alcohol or nonylphenols.

Suitable copolymers containing acrylonitrile are, for example, those with vinyl chloride, vinylidene chloride, vinyl acetate, vinyl chloroacetate, vinyl alcohol, acrylic and methacrylic acid, acrylic and methacrylic acid esters, allyl chloroacetate or basic vinyl compounds, such as, for example, vinyl imidazole, vinyl benzimidazole, vinyl-pyridine, vinyl-methylpyridine, vinyl-pyrimidine, provided the proportion of the co-monomers is not higher than 20 percent by weight.

Dyeing of the polyacrylonitrile articles can be carried out in the usual manner in that the articles are first impregnated with an aqueous solution the pH value of which should expediently be between 2.5 and 6.5 and which contains, in addition to the dyestuffs, the compounds containing thiophen-1,1-dioxide groups, which are to be used according to the invention, and optionally also dispersing agents and other dyeing and textile auxiliaries, for example, methyl glycol or diethylene glycol and thickening agents, and that the articles are then subected to a thermal after-treatment. Impregnation can be carried out in the usual manner, for example, by spraying, coating or treating on the foulard. The thermal after-treatment can be performed by steaming at 100° C. for 10 to 30 minutes or by steaming at 125 to 130° C. for 2–3 minutes with natural saturated steam, or by thermosolisation, i.e. by heating at 180 to 200° C. for 20 to 90 seconds.

With the aid of the process according to the invention it is possible to dye a great variety of articles which consist of polyacrylonitrile or of copolymers containing acrylonitrile, for example, cable sheathing, combed materials, flocks, filaments, ribbons, foils, yarns, fabrics or knitted fabrics, in a continuous process with outstanding levelness and in deep shades.

The parts given in the following examples are parts by weight; the dyestuff numbers refer to the data given in Colour Index, 2nd Edition, volume 3; the mixture of auxiliaries (A) consists of equal parts of the following compounds:

(a) oleic acid ethanolamide
(b) reaction product of 20 moles ethylene oxide with 1 mole oleyl alcohol
(c) reaction product of 10 moles ethylene oxide with 1 mole nonylphenyl;

the thickening agent used is a commercial thickening agent based on carob bean flour with a solids content of 5%.

EXAMPLE 1

A combed material of polyacrylonitrile is impregnated with an aqueous liquor prepared from 30 parts of the dyestuff C.I. No. 48,015
15 parts 3-(p-phenylethoxy)-tetrahydrothiophen-1,1-dioxide
120 parts of a thickening agent
15 parts of the mixture (A) and
820 parts of water.

The combed material is subsequently squeezed to a weight increase of 90%, treated with neutral saturated steam at 103° C. for 25 minutes, then rinsed with water and dried. The combed material is dyed in a brilliant red shade.

Similar results were achieved when the 3-(β-phenyl-ethoxy)-tetrahydrothiophen-1,1-dioxide was replaced with the same amount of one of the following compounds:

3-(benzyloxy)-tetrahydrothiophen-1,1-dioxide,
3-(γ-phenylpropoxy)-tetrahydrothiophen-1,1-dioxide,
3-(furyl-2-methoxy)-tetrahydrothiophen-1,1-dioxide,
3-(thienyl-2-methoxy)-tetrahydrothiophen-1,1-dioxide,
3-(β-phenoxy-ethoxy)-tetrahydrothiophen-1,1-dioxide,
3-(2-phenoxy-propoxy)-tetrahydrothiophen-1,1-dioxide, These compounds can be obtained in a similar manner as 3-(β-phenylethoxy)-tetrahydrothiophenol-1,1-dioxide by heating 2,5-dihydrothiophen-1,1-dioxide for several hours with the corresponding alcohols in the presence of catalytic amounts of a base, such as sodium methylate, or of alkali metal hydroxides, such as sodium or potassium hydroxide.

The 3-(β-phenylethoxy)-tetrahydrothiophen-1,1-dioxide used above was prepared by heating 183 parts β-phenyl-ethanol
4 parts sodium methylate and
120 parts 2,5-dihydrothiophen-1,1-dioxide at 80° C. for 8 hours with stirring and subsequently freeing the reaction product from small amounts of insoluble impurities by filtration.

EXAMPLE 2

A fabric of polyacrylonitrile is impregnated on a foulard with an aqueous liquor prepared from 30 parts of the dyestuff C.I. No. 51,005
15 parts 3-(3',3',5'-trimethyl-cyclohexyloxy)-tetrahydrothiophen-1,1-dioxide
15 parts of the mixture (A)
10 parts sodium acetate
120 parts of a thickening agent and
810 parts of water.

After squeezing to a weight increase to 80%, the fabric is treated with neutral saturated steam at 103° C. for 30 minutes, then rinsed with water and dried. The fabric is dyed in a level blue shade.

Similar results were achieved when the 3-(3',3',5'-trimethyl-cyclohexyloxy)-tetrahydrothiophen-1,1-dioxide was replaced with the same amount of one of the following compounds:

3-(cyclohexyloxy)-tetrahydrothiophen-1,1-dioxide,
3-(cyclohex-2'-enyloxy)-tetrahydrothiophen-1,1-dioxide,
3-(cyclohex-3'-enyloxy)-tetrahydrothiophen-1,1-dioxide,
3-(4'-methyl-cyclohexyloxy)-tetrahydrothiophen-1,1-dioxide,
3-(4'-tert-butyl-cyclohexyloxy)-tetrahydrothiophen-1,1-dioxide,
3-(tetrahydrofuryl-2-methoxy)-tetrahydrothiophen-1,1-dioxide,
3-[2'-(3'',3'',5''-trimethyl-cyclohexyloxy)-ethoxy]-tetrahydrothiophen-1,1-dioxide, furthermore, the addition products of 3,3,5-trimethyl-cyclohexanol on to:

2-methyl-2,5-dihydrothiophen-1,1-dioxide,
3-methyl-2,5-dihydrothiophen-1,1-dioxide,
2-methyl-2,3-dihydrothiophen-1,1-dioxide,
3-methyl-2,3-dihydrothiophen-1,1-dioxide,
4-methyl-2,3-dihydrothiophen-1,1-dioxide,
5-methyl-2,3-dihydrothiophen-1,1-dioxide,
2,4-dimethyl-2,5-dihydrothiophen-1,1-dioxide,
3,4-dimethyl-2,5-dihydrothiophen-1,1-dioxide.

All these compounds can be obtained in an analogous manner to 3-(3',3',5'-trimethyl-cyclohexyloxy)-tetrahydrothiophen-1,1-dioxide.

The 3-(3',3',5'-trimethyl-cyclohexyloxy)-tetrahydrothiophen-1,1-dioxide used above was prepared by heating 106 parts 3,3,5-trimethyl-cyclohexanol
2 parts sodium methylate and
100 parts 2,5-dihydrothiophen-1,1-dioxide
at 65–70° C. for 24 houds while stirring.

EXAMPLE 3

A fabric of polyacrylonitrile is impregnated with a liquor prepared from 20 parts of the dyestuff C.I. No. 48,020
15 parts 3-n-butoxy-tetrahydrothiophen-1,1-dioxide
15 parts of the mixture (A)
120 parts of a thickening agent and
830 parts of water.

The fabric is then squeezed to a weight increase of 100%, subsequently dried and heated at 190° C. for 30 seconds. A level red-violet dyeing of good fastness properties is obtained.

Similar results were achieved when the 3-n-butoxy-tetrahydrothiophen-1,1-dioxide was replaced with the same amount of one of the following compounds:

3-methoxy-tetrahydrothiophen-1,1-dioxide,
3-ethoxy-tetrahydrothiophen-1,1-dioxide,
3-n-propoxy-tetrahydrothiophen-1,1-dioxide,
3-i-propoxy-tetrahydrothiophen-1,1-dioxide,
3-i-butoxy-tetrahydrothiophen-1,1-dioxide,
3-sec-butoxy-tetrahydrothiophen-1,1-dioxide,
3-n-pentoxy-tetrahydrothiophen-1,1-dioxide,
3-n-hexoxy-tetrahydrothiophen-1,1-dioxide,
3-(3'-methoxybutoxy)-tetrahydrothiophen-1,1-dioxide,
3-(2'-n-butoxy-ethoxy)-tetrahydrothiophen-1,1-dioxide,
3-(2',2'-dimethylhexoxy)-tetrahydrothiophen-1,1-dioxide,
3-(3',5',5'-trimethylhexoxy)-tetrahydrothiophen-1,1-dioxide,
3-allyloxy-tetrahydrothiophen-1,1-dioxide,
3-but-2'-enyloxy-tetrahydrothiophen-1,1-dioxide,
3-methoxy-2,3-dihydrothiophen-1,1-dioxide,
3-butoxy-2,3-dihydrothiophen-1,1-dioxide,
4-butoxy-2,3-dihydrothiophen-1,1-dioxide,
3-(2'-methoxy-ethoxy)-tetrahydrothiophen-1,1-dioxide,
3-(2'-ethoxy-ethoxy)-tetrahydrothiophen-1,1-dioxide,
3-(2'-propoxy-ethoxy)-tetrahydrothiophen-1,1-dioxide,
3-hydroxy-tetrahydrothiophen-1,1-dioxide,
3-cyano-tetrahydrothiophen-1,1-dioxide,
3-[2'-(2''-ethoxy-ethoxy)-ethoxy]-tetrahydrothiophen-1,1-dioxide,
3-(2'-allyloxy-ethoxy)-tetrahydrothiophen-1,1-dioxide,
3-(2'-butoxy-propoxy)-tetrahydrothiophen-1,1-dioxide,
4-methyl-2,3-dihydro-1,1-dioxo-thiophen-3-one,
tetrahydro-1,1-dioxo-thiophen-3-one
tetrahydro-1,1-dioxo-thiophen-3-one-oxime,
3-methyl-2,3-dihydrothiophen-1,1-dioxide,
4-methyl-2,3-dihydrothiophen-1,1-dioxide,
5-methyl-2,3-dihydrothiophen-1,1-dioxide,
3-benzoylamino-tetrahydrothiophen-1,1-dioxide,
2-methyl-tetrahydrothiophen-1,1-dioxide,
2,3-dihydrothiophen-1,1-dioxide,
tetrahydrothiophen-1,1-dioxide,
3-methyl-tetrahydrothiophen-1,1-dioxide,
2,4-dimethyl-tetrahydrothiophen-1,1dioxide.

The 3-n-butoxy-tetrahydrothiophen-1,1-dioxide used above was prepared by heating 100 parts n-butanol
4 parts sodium methylate and
115 parts 2,5-dihydrothiophen-1,1-dioxide at 60° C. for 5 hours with stirring and subsequently free the reaction product from small amounts of undissolved impurities by filtration.

EXAMPLE 4

A combined material of polyacrylonitrile is impregnated with a liquor prepared from 30 parts of the dyestuff C.I. No. 42,025
20 parts 3-(but-2'-enylmercapto)-tetrahydrothiophen-1,1-dioxide
20 parts of the mixture (A)
120 parts of a thickening agent and
800 parts of water.

The combed material is subsequently squeezed on a roller foulard to a weight increase of 90%, then steamed with neutral saturated steam at 103° C. for 20 minutes, then rinsed with water and dried. A brilliiant blue dyeing is obtained.

Similar results were achieved when the 3-(but-2'-enyl-mercapto)-tetrahydrothiophen-1,1-dioxide was replaced with the same amount of one of the following compounds:

3-(prop-2'-enylmercapto)-tetrahydrothiophen-1,1-dioxide,
3-(2'methyl-prop-2'-enylmercapto)-tetrahydrothiophen-1,1-dioxide,
3-(prop-2'-inylmercapto)-tetrahydrothiophen-1,1-dioxide,
3-benzylmercapto-tetrahydrothiophen-1,1-dioxide,
3-(2'-prop-2''-enylmercapto-ethoxy)-tetrahydrothiophen-1,1-dioxide,
3-(2'-prop-2''-enyloxy-ethylmercapto)-tetrahydrothiophen-1,1-dioxide,
3-(2'-benzylmercapto-ethoxy)-tetrahydrothiophen-1,1-dioxide,
3-methylmercapto-4-chloro-tetrahydrothiophen-1,1-dioxide
3-phenylmercapto-4-chloro-tetrahydrothiophen-1,1-dioxide
3-methylmercapto-2,3-dihydrothiophen-1,1-dioxide,
4-methylmercapto-2,3-dihydrothiophen-1,1-dioxide,
3-phenylmercapto-2,3-dihydrothiophen-1,1-dioxide,
4-phenylmercapto-2,3-dihydrothiophen-1,1-dioxide,
3-phenylmercapto-tetrahydrothiophen-1,1-dioxide,
2-phenylmercapto-3-chloro-tetrahydrothiophen-1,1-dioxide,
2-n-butylmercapto-tetrahydrothiophen-1,1-dioxide.

The 3 - (but -2' - enylmercapto)-tetrahydrothiophen-1,1-dioxide used above was prepared in the following manner:

A solution of 56 parts sodium hydrogen sulphide in 120 parts of water was mixed at 60–65° C., while stirring, first with 118 parts 2,5-dihydrothiophen-1,1-dioxide and then, after about 3 hours, dropwise with 135 parts crotyl bromide. After further stirring at 50° C. fo 2 hours and subsequent cooling of the reaction mixture, the precipitated crystals were filtered off with suction.

EXAMPLE 5

A fabric of polyacrylonitrile is impregnated with an aqueous liquor prepared from 30 parts of the dyestuff C.I. No. 48,013
20 parts 1,2-bis-(tetrahydra-1,1-dioxo-thienyl-3-mercapto)-ethane
120 parts of a thickening agent,
15 parts of the mixture (A) and
805 parts of water.

The fabric is subsequently squeezed to a weight increase of 100%, then heated, according to the pad-roll dyeing process (system Rydboholm-Artos) at about 80° C. by a continuous passage through an infrared heating zone, then rolled up tensionless in a dyeing chamber where it is heated at 100° C. for 6 hours. The fabric is subsequently rinsed and dried. A brilliant red-violet dyeing of excellent fastness is obtained.

Similar results were achieved when the 1,3-bis(tetrahydro - 1,1 - dioxo-thienyl - 3 - mercapto)-ethane was replaced with the same amount of one of the following compounds:

3-methylmercapto-tetrahydrothiophen-1,1-dioxide,
3-ethylmercapto-tetrahydrothiophen-1,1-dioxide,
3-i-propylmercapto-tetrahydrothiophen-1,1-dioxide,
3-amylmercapto-tetrahydrothiophen-1,1-dioxide,
3-n-butylmercapto-tetrahydrothiophen-1,1-dioxide,
3-(2'-hydroxy-ethylmercapto)-tetrahydrothiophen-1,1-dioxide,
3-[2'-(2''-hydroxy-ethoxy)-ethylmercapto]-tetrahydrothiophen-1,1-dioxide,
3-(2'-hydroxy-propylmercapto)-tetrahydrothiophen-1,1-dioxide,
3-[2'-(2''-hydroxy-propoxy)-propylmercapto]-tetrahydro-thiophen-1,1-dioxide,
1,3-bis(tetrahydro-1,1-dioxo-thienyl-3-mercapto)-2-hydroxy-propane,
1,4-bis(tetrahydro-1,1-dioxo-thienyl-3-mercapto)butane,
bis(tetrahydro-1,1-dioxo-thienyl-3-)-sulphide,
bis(2,5-dihydro-1,1-dioxo-thienyl-3)-sulphide,
3-(4'-hydroxy-tetrahydro-1,1-dioxo-thienyl-3-mercapto)-tetrahydrothiophen-1,1-dioxide,
bis[2-(tetrahydro-1,1,1-dioxo-thienyl-3-oxy)-ethylmercapto]-methane.

The compounds can be obtained in a similar manner as 1,1-bis-(tetrahydro - 1,1 - dioxo-thienyl - 3 - mercapto)-ethane.

The 1,2-bis-(tetrahydro - 1,1 - dioxo-thienyl - 3 - mercapto)-ethane used above was prepared in the following manner:

A solution of 56 parts sodium hydrogen sulphide in 120 parts of water was mixed at 60–65° C., while stirring, first with 118 parts 2,5-dihydrothiophen - 1,1 - dioxide and then, after about 3 hours, dropwise with 45 parts 1,2-dichloroethane. After further stirring at 60° C. for 8 hours and subsequent cooling, the precipitated crystals were filtered off with suction.

EXAMPLE 6

A combed material of polyacrylonitrile is impregnated with a liquor prepared from 20 parts of the dyestuff C.I. No. 48,040
30 parts O-methyl-S-(tetrahydro - 1,1 - dioxo-thienyl - 3)-thiocarbonic acid ester
15 parts of the mixture (A)
120 parts of a thickening agent and
815 parts of water.

The combed material is subsequently squeezed to a weight increase of 90%, then dried and heated at 190° C. for 30 seconds. A level deep orange dyeing is obtained.

Similar results were achieved when the O-methyl-S-(tetrahydro - 1,1 - dioxo-thienyl - 3) - thiocarbonic acid ester was replaced with the same amount of one of the following compounds:

3-acetylmercapto-tetrahydrothiophen-1,1-dioxide,
3-propionylmercapto-tetrahydrothiophen-1,1-dioxide,
3-butyrylmercapto-tetrahydrothiophen-1,1-dioxide,
3-(γ-hydroxy-butyrylmercapto)-tetrahydrothiophen-1,1-dioxide,
3-benzoylmercapto-tetrahydrothiophen-1,1-dioxide,
3-acetylmercapto-4-acetyloxy-tetrahydrothiophen-1,1-dioxide,
tetrahydro-1,1-dioxo-thienyl-3-phosphonic acid-di-n-butyl ester,
O,O-diethyl-S-(tetrahydro-1,1-dioxo-thienyl-3)-dithiophosphoric acid ester,
O,O-diethyl-S-(4-chloro-tetrahydro-1,1-dioxo-thienyl-3)-thiophosphoric acid ester,
O,O-diethyl-S-(2,3-dihydro-1,1-dioxo-thienyl-3)-thiophosphoric acid ester,
O,O-diethyl-S-(2,3-dihydro-1,1-dioxo-thienyl-3)-thiophosphoric acid ester,
O,O-dimethyl-S-(2,3-dihydro-1,1-dioxo-thienyl-3)-dithiophosphoric acid ester,
O,O-diethyl-S-(tetrahydro-1,1-dioxo-thienyl-2)-thiophosphoric acid ester.

The O-methyl-S-(tetrahydro - 1,1 - dioxo-thienyl - 3)-thiocarbonic acid ester used above was prepared in the following manner:

A solution of 56 parts sodium hydrogen sulphide in 120 parts of water was mixed at 60–65° C., while stirring, first with 118 parts 2,5-dihydrothiophen - 1,1 - dioxide and then, after about 3 hours, dropwise at 30° C. with 85 parts chloroformic acid methyl ester. After about one hour, the precipitated reaction product was filtered off with suction.

EXAMPLE 7

A combed material of polyacrylonitrile is impregnated with an aqueous liquor prepared from 20 parts of the dyestuff C.I. No. 42,040
20 parts tetrakis [2-tetrahydro-1',1'-dioxo-thienyl-3'-oxy)-ethoxy-methyl]-methane
20 parts of the mixture (A)
120 parts of a thickening agent and
800 parts of water.

The combed material is subsequently squeezed on a roller foulard to a weight increase of 90%, then steamed with neutral saturated steam at 103° C. for 20 minutes, then rinsed with water and dried. A deep green dyeing is obtained.

Similar results were achieved when the tetrakis [-(tetrahydro - 1',1' - dioxo-thienyl - 3' - oxy)-ethoxy-methyl]-methane was replaced with the same amount of one of the following compounds:

tris[2-(tetrahydro - 1',1'-dioxo-thienyl-3'-oxy)-ethoxymethyl]-(2-hydroxyethoxy-methyl)-methane,
bis[2-(tetrahydro-1',1'-dioxo-thienyl-3'-oxy)-ethoxymethyl]-bis(2-hydroxyethoxy-methyl)-methane,
tetrakis(tetrahydro-1,1-dioxo-thienyl-3-oxy-methyl)-methane,
1,4-bis(tetrahydro-1',1'-dioxo-thienyl-3'-oxy)-butane,
1,1,1-bis[2'-(tetrahydro-1'',1''-dioxo-thienyl-3''-oxy)-ethoxy-methyl]propane,
1,1,1-tris[2'-(tetrahydro-1'',1''-dioxo-thienyl-3''-oxy)-propoxy-methyl]propane,
1,2,3-tris[2'-(tetrahydro-1'',1''-dioxo-thienyl-3''-oxy)-ethoxy]propane,
1,4-bis[2-(tetrahydro-1',1'-dioxo-thienyl-3'-oxy)-ethoxy]-benzene,
1,4-bis(tetrahydro-1,1-dioxo-thienyl-3'-oxy)butene-(2),
1,4-bis(tetrahydro-1',1'-dioxo-thienyl-3'-oxy)butine-(2),
2,5-bis(isopropylidene)-2,5-dihydro-thiophen-1,1-dioxide,
2,5-bis(benzylidene)-2,5-dihydro-thiophen-1,1-dioxide, furthermore, the reaction products resulting from the reaction of 20 to 30 moles 2,5-dihydrothiophen-1,1-dioxide with a polyvinyl alcohol containing 40 to 60 units vinyl alcohol.

The tetrakis[2-(tetrahydro-1',1'-dioxo-thienyl-3'-oxy)-ethoxy-methyl]-methane used above was prepared by heating 65 parts of the reaction product of 4 moles ethylene oxide and 1 mole pentaerythritol, obtained according to U.S. Pat. specification No. 2,401,743, with 4 parts sodium methylate and 100 parts 2,5-dihydrothiophen-1,1-dioxide at 70° C. for 18 hours while stirring.

EXAMPLE 8

A fabric of polyacrylonitrile is impregnated with a liquor prepared from 20 parts of the dyestuff C.I. No. 42,025
20 parts N-[2'-(tetrahydro-1'',1''-dioxo-thienyl-3''-oxy)-ethyl]-pyrrolidone-(2)
15 parts of the mixture (A)
120 parts of a thickening agent and
820 parts of water After squeezing to a weight increase of 80%, the fabric is treated with neutral saturated steam for 30 minutes, then rinsed with water and dried. The fabric is dyed in a brilliant blue shade.

Similar results were achieved when the N-[2'-(tetrahydro - 1'',1'' - dioxo-thienyl-3''-oxy)-ethyl]-pyrrolidone-(2) was replaced with the same amount of one of the following compounds:

N-[3'-(tetrahydro-1'',1''-dioxo-thienyl-3''-oxy)-propyl-1']-pyrrolidone-(2),
N-(tetrahydro-1',1'-dioxo-thienyl-3')-pyridone-(2),
N-(tetrahydro-1,1-dioxo-thienyl-3)-caprolactam,
1-[2'-(tetrahydro-1'',1''-dioxo-thienyl-3''-oxy)-ethyl]-3,5-dimethyl-pyrazole,
N-(tetrahydro-1',1'-dioxo-thienyl-3')-pyrrolidone-(2).

The N-[2'-(tetrahydro-1'',1'' - dioxo - thienyl-3''-oxy)-ethyl]-pyrrolidone-(2) was prepared by heating 129 parts N-(β-hydroxyethyl)-pyrrolidone-(2)
1 part sodium methylate and
118 parts 2,5-dihydrothiophen-1,1-dioxide at 65–70° C. for 10 hours while stirring.

EXAMPLE 9

A combed material of polyacrylonitrile is impregnated with an aqueous liquor prepared from 30 parts of the dyestuff C.I. No. 48,015
15 parts 3-(β-cyanoethyl-thio)-tetrahydrothiophen-1,1-dioxide
120 parts of a thickening agent
15 parts of the mixture (A) and
820 parts of water The combed material is subsequently squeezed to a weight increase of 90%, treated with neutral saturated steam at 103° C. for 25 minutes, then rinsed with water and dried. The combed material is dyed in a brilliant red shade.

A similar level and brilliant dyeing was obtained when the 3-(β-cyanoethyl-thio)-tetrahydrothiophen-1,1-dioxide was replaced with the same amount of one of the following compounds:

3-[β-(2'-cyanoethoxy)-ethylthio]-tetrahydrothiophen-1,1-dioxide,
3-(2'-cyanoethoxy-methylthio)-tetrahydrothiophen-1,1-dioxide,
3-(cyanomethylthio)-tetrahydrothiophen-1,1-dioxide,
3-[γ-(2'-cyanoethoxy)-β-hydroxy-n-propylthio]-tetrahydrothiophen-1,1-dioxide,
3-[β,γ-bis-(2'-cyanoethoxy)-n-propylthio]-tetrahydrothiophen-1,1-dioxide,
3-[γ-(2'-cyanoethoxy)-β-methoxy-n-propylthio]-tetrahydrothiophen-1,1-dioxide,
3-[β-(2'-cyanoethoxy)-γ-(tetrahydro-1'',1''-dioxothienyl-3''-oxy)-n-propylthio]-tetrahydrothiophen-1,1,-dioxide,
3 -[β-(2'-cyanoethoxy) - γ - (tetrahydro-1'',1''-dioxothienyl - 3'' - thio)-n-propylthio]-tetrahydrothiophen-1,1-dioxide,
3 - [β - (2' - cyanoethylthio) - γ - (tetrahydro-1'',1''-dioxothienyl - 3'' - thio)-n-propylthio]-tetrahydrothiophen-1,1-dioxide,
3-[β-(2'-cyanoethoxy-ethoxy)-ethylthio]-tetrahydrothiophen-1,1-dioxide,
3-(2'-cyanoethylthio)-4-hydroxy-tetrahydrothiophen-1,1-dioxide,
3-(2'-cyanoethylthio)-4-(2'-cyanoethoxy)-tetrahydrothiophen-1,1-dioxide,
3-[β-(2'-cyanoethoxy)-n-propylthio]-tetrahydrothiophen-1,1-dioxide,
3-(2'-cyanoethylthio)-5-methyl-tetrahydrothiophen-1,1-dioxide,
3-(2'-cyanoethylthio)-3-methyl-tetrahydrothiophen-1,1-dioxide.

The 3-(β-cyanoethyl-thio)-tetrahydrothiophen-1,1-dioxide used above was prepared in the following manner:
450 parts of a 41% aqueous solution of the sodium salt of 3-mercapto-tetrahydrothiophen-1,1-dioxide were slowly mixed at 20 to 30° C. with 75 parts acrylonitrile, the pH value of the solution being kept at 10 to 11 by the simultaneous addition of HCl. When the cyanoethylation was completed, the reaction mixture was cooled to 0° C. and the crystallised reaction product was filtered off with suction, washed with ice-water and dried in a vacuum.

Yield 195 parts=90% of theory.

EXAMPLE 10

A fabric of polyacrylonitrile is impregnated on a foulard with an aqueous liquor prepared from 30 parts of the dyestuff C.I. No. 51,005
15 parts 3-(β-cyanoethoxy)-tetrahydrothiophen-1,1,-dioxide
15 parts of the mixture (A)
10 parts sodium acetate
120 parts of a thickening agent and
810 parts of water.

After squeezing to a weight increase of 80%, the fabric is treated with neutral saturated steam at 103° C. for 30 minutes, then rinsed with water and dried. The fabric is dyed in a level blue shade.

A similar level blue dyeing was obtained when the 3-(β-cyanoethoxy)-tetrahydrothiophen-1,1-dioxide was replaced with the same amount of one of the following compounds:

3-(2'-cyanoethoxymethoxy)-tetrahydrothiophen-1,1-dioxide,
3-[β-(2'-cyanoethoxy)-ethoxy]-tetrahydrothiophen-1,1-dioxide,
3-[β-hydroxy-γ-(2'-cyanoethoxy)-n-propoxy]-tetrahydrothiophen-1,1-dioxide,
3-[β,γ-bis-(2'-cyanoethoxy)-n-propoxy]-tetrahydrothiophen-1,1-dioxide,
3-[β-hydroxy-γ-(2'-cyanoethylthio)-n-propoxy]-tetrahydrothiophen-1,1-dioxide,
3-[β-(2'-cyanoethoxy)-γ-(2''-cyanoethylthio)-n-propoxy]-tetrahydrothiopen-dioxide,
3-[β-methoxy-γ-(2'-cyanoethylthio)-n-propoxy]-tetrahydrothiophen-1,1-dioxide,
3-[β-methoxy-γ-(2'-cyanothoxy)-n-propoxy]-tetrahydrothiophen-1,1-dioxide,
3-[β-(2'-cyanoethoxy)-γ-(tetrahydro-1'',1''-dioxothienyl-3''-oxy)-n-propoxy]-tetrahydrothiophen-1,1-dioxide,
3-[β-(2'-cyanoethoxy-ethyldithio)-ethoxy]-tetrahydrothiophen-1,1-dioxide,
3-[β-(2'-cyanoethoxy-ethylthio)-ethoxy]-tetrahydrothiophen-1,1-dioxide,
3-(β-cyanoethoxy)-4-chloro-tetrahydrothiophen-1,1-dioxide,
3-(β-cyanoethoxy)-2,3-dihydrothiophen-1,1-dioxide,
1,1,1-tris[2'-(tetrahydro-1'',1''-dioxo-thienyl-3''-oxy)-ethoxymethyl]-2-(2'-β-cyanoethoxyethoxy)-ethane,
2,2-bis-[2'-(tetrahydro-1'',1''-dioxo-thienyl-3''-oxy)-ethoxymethyl]-1,3-bis-(2'-β-cyanoethoxy-ethoxy)-propane,
2,2-bis-[2'-(tetrahydro-1'',1''-dioxo-thienyl-3''-oxy)-ethoxymethyl]-1-(2'-β-cyanoethoxy-ethoxy)-butane,
3-(β-cyanoethoxy)-4-methoxy-tetrahydrothiophen-1,1-dioxide.

These compounds can be obtained in an analogous manner to 3-(β-cyanoethoxy)-tetrahydrothiophen-1,1-dioxide by a base-catalysed addition of the corresponding hydroxy compounds on to thiophen- or dihydrothiophen-1,1-dioxides.

The 3-(β-cyanoethoxy)-tetrahydrothiophen-1,1-dioxide used above was prepared in the following manner:

200 parts 2,5-dihydrothiophen-1,1-dioxide were introduced with stirring into a mixture of 110 parts 3-hydroxypropionitrile and 4 parts sodium methylate. The reaction mixture was subsequently heated at 70 to 75° C. for 9 hours while stirring. The reaction product was obtained in the form of a water-soluble oil.

EXAMPLE 11

A fabric of polyacrylonitrile is impregnated with a liquor prepared from 20 parts of the dyestuff C.I. No. 48,020
15 parts 3-(β-cyanoethylamino)-tetrahydrothiophen-1,1-dioxide
15 parts of the mixture (A)
120 parts of a thickening agent and
830 parts of water The fabric is then squeezed to a weight increase of 100%, subsequently dried and heated at 190° C. for 30 seconds. A level red-violet dyeing of good fastness properties is obtained.

A similar level red-violet dyeing was obtained when the 3-(β-cyanoethylamino)-tetrahydrothiophen-1,1-dioxide was replaced with the same amount of one of the following compounds:

3-[bis-(β-cyanoethyl)-amino]-tetrahydrothiophen-1,1-dioxide,
3-[bis-(β-cyanoethyl)-aminocarbonyl]-tetrahydrothiophen-1,1-dioxide,
3-[(β-cyanoethyl)-(3'-tetrahydro-1',1'-dioxo-thienyl)-amino]-tetrahydrothiophen-1,1-dioxide.

The 3-(β-cyanoethylamino)-tetrahydrothiophen-1,1-dioxide used above was obtained by a base-catalysed addition of acrylonitrile on to 3-amino-tetrahydrothiophen-1,1-dioxide. The three other compounds were prepared by an analogous reaction.

EXAMPLE 12

A combed material of polyacrylonitrile is impregnated with a liquor prepared from 30 parts of the dyestuff C.I. No. 42,025
20 parts 3-(β-cyanoethyl)-2,5-dihydrothiophen-1,1-dioxide
20 parts of the mixture (A)
120 parts of a thickening agent and
800 parts of water The combed material is subsequently squeezed on a roller foulard to a weight increase of 90%, then steamed with neutral saturated steam at 103° C. for 20 minutes, then rinsed with water and dried. A brilliant blue dyeing is obtained.

A similar brilliant blue dyeing was obtained when the 3-(β-cyanoethyl)-2,5-dihydrothiophen-1,1-dioxide was replaced with the same amount of one of the following compounds:

3-(β-cyanoethylthiomethyl)-2,5-dihydrothiophen-1,1-dioxide,
3-(β-cyanoethoxymethyl)-2,5-dihydrothiophen-1,1-dioxide The 3-(β-cyanoethyl)-2,5-dihydrothiophen-1,1 - dioxide used above was obtained by a base-catalysed addition of acrylonitrile on to 2,5-dihydrothiophen-1,1-dioxide.

We claim:
1. Process for the continuous dyeing of articles made of polyacrylonitrile or of copolymers containing at least 80% acrylonitrile by impregnation with an aqueous liquor containing cationic dyestuffs and subsequent thermal treatment, wherein the aqueous dyebath serving for impregnation, contains compounds which carry at least one partially or completely hydrogenated thiophen-1,1-dioxide group selected from the group consisting of di- and tetrahydrothiophen-1,1-dioxide.

2. Process according to claim 1 wherein the compounds containing at least one partially or completely hydrogenated thiophen-1,1-dioxide group, are compounds of the formula $$Z_1-[(X-R')_m-Y-\underset{\underset{O_2}{S}}{\diagdown}-(R'')_k]_p$$

in which the symbols have the following meaning:

$m$ is a number from 0 to 5
$k$ is a number from 0 to 3
$p$ is a number from 1 to 8

X and Y, independently of one another, are oxygen or sulphur

R' is a lower alkylene radical which may be substituted by hydroxy, alkoxy or alkylmercapto groups or by halogen R" is a hydrocarbon radical which is linked via a single or double bond and may be substituted by alkyl, hydroxy, alkoxy, amino, carboxyl or carbonamide groups; an annellated carbocycle or heterocycle; a halogen atom; a functional organic group linked via a single or double bond; an oxygen or sulphur atom $Z_1$ is the radical of a polyfunctional compound in which one or more functional groups may be replaced with the grouping

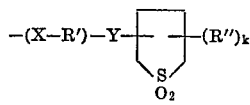

3. Process according to claim 2, wherein the compounds containing at least one partially or completely hydrogenated thiophen-1,1-dioxide group, are compounds of the formula

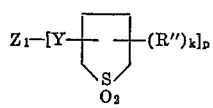

wherein $Z_1$, Y, R", $k$ and $p$ have the same meaning as in claim 2.

4. Process according to claim 2, wherein the compounds containing at least one partially or completely hydrogenated thiophen-1,1-dioxide group, are compounds of the formula

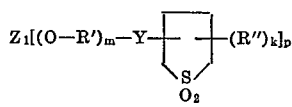

wherein $Z_1$, R', Y, R", $m$, $k$ and $p$ have the same meaning as in claim 2.

5. Process according to claim 2, wherein the compounds containing at least one partially or completely hydrogenated thiophen-1,1-dioxide group, are compounds of the formula

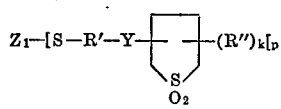

wherein $Z_1$, R', Y, R", $k$ and $p$ have the same meaning as in claim 2.

6. Process according to claim 1, wherein the compounds containing at least one partially or completely hydrogenated thiophen-1,1-dioxide group, are compounds of the formula

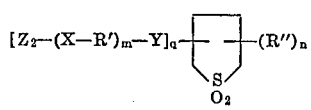

in which $m$, X, Y, R' and R" have the same meaning as in claim 2 and $n$ is a number from 0 to 4, $q$ is a number from 0 to 4 and $Z_2$ is a saturated or unsaturated alkyl radical with 1 to 20 carbon atoms, which may be substituted by hydroxy, alkoxy, or halogen; a cycloalkyl radical which may be substituted by alkyl or alkoxy; an aryl or hetero-aryl radical which may be substituted by halogen, cyanogen or alkoxy; an acyl group which may be substituted by hydroxy, alkoxy, halogen or cyanogen; or a di- or tetrahydro-thiophen-1,1-dioxide radical which may be substituted by alkyl or halogen.

7. Process according to claim 6, wherein the compounds containing at least one partially or completely hydrogenated thiophen-1,1-dioxide group, are compounds of the formula

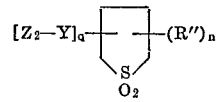

wherein $Z_2$, Y, R", $q$ and $n$ have the same meaning as in claim 6.

8. Process according to claim 6, wherein the compounds containing at least one partially or completely hydrogenated thiophen-1,1-dioxide group, are compounds of the formula

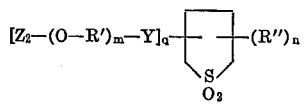

wherein Z', R', Y, R", $m$, $q$ and $n$ have the same meaning as in claim 6.

9. Process according to claim 6, wherein the compounds containing at least one partially or completely hydrogenated thiophen-1,1-dioxide group, are compounds of the formula

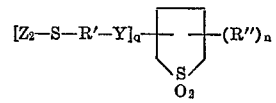

wherein $Z_2$, R', Y, R", $q$ and $n$ have the same meaning as in claim 6.

10. Process according to claim 1, wherein the compounds containing at least one partially or completely hydrogenated thiophen-1,1-dioxide group, are compounds of the formula

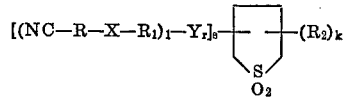

in which $l$ is 0 or 1.

$k$ is a number from 0 to 3

$s$ is a number from 1 to 4

$r$ is 0 or 1

X and Y, independently of one another, are oxygen or sulphur

R is a lower alkylene radical $R_1$ is an alkylene radical with not more than 8 carbon atoms, which may be substituted by hydroxy, alkoxy or cyanoalkyl groups and the carbon chain of which may be interrupted by nitrogen, oxygen or sulphur and $R_2$ is a hydrocarbon radical which is linked via a single or double bond and may be substituted by alkyl, hydroxy, alkoxy, amino, mercapto, cyano, carboxylic acid ester or carbonamide groups; an annellated carbocycle or heterocycle; a halogen atom; a functional organic group linked via a single or double bond; an oxygen or sulphur atom.

11. Articles made of polyacrylonitrile or of copolymers containing at least 80% acrylonitrile, dyed according to claim 1.

References Cited

UNITED STATES PATENTS

| | | | |
|---|---|---|---|
| 3,017,397 | 1/1962 | Fournet et al. | 8—173X |
| 3,038,775 | 6/1962 | Robbins | 8—173X |

GEORGE F. LESMES, Primary Examiner

T. J. HERBERT, Assistant Examiner

U.S. Cl. X.R.

8—173, 177; 260—332.1

UNITED STATES PATENT OFFICE
CERTIFICATE OF CORRECTION

Patent No. 3,574,512           Dated April 13, 1971

Inventor(s) JOHANN WEBER, deceased (HELENE WEBER, heir) ET AL

It is certified that error appears in the above-identified patent and that said Letters Patent are hereby corrected as shown below:

| Column | Line | Error |
|---|---|---|
| 1 | 1st formula | "$(R''_k)]_p$" should be --- $(R'')_k\ ]_p$ --- |
| 3 | 40 | "(hydroxymethyl)-1-propanol" should be (hydroxymethyl) - propanol --- |
| 3 | 63 | "tert" should be --- _tert_ --- |
| 4 | 3 | "$\alpha$" should be --- $\gamma$ --- |
| 4 | 10 | "thieny" should be ---thienyl-- |
| 5 | 2nd formula | "(OR')" should be ---(O-R')--- |
| 6 | 40 | "tetrahydrothiophen-1,1-" should be ---tetrahydrothiophen-1,1-diox--- |
| 7 | 20 | "phohphonic" should be ---phosphonic--- |
| 8 | 27 | "Natural" should be ---neutral- |
| 8 | 56 | "(p-phenylethoxy)" should be ---($\beta$-phenylethoxy)--- |
| 9 | 42 | "tert" should be --- _tert_ --- |

UNITED STATES PATENT OFFICE
CERTIFICATE OF CORRECTION

Page 2

Patent No. 3,574,512               Dated April 13, 1971

Inventor(s) JOHANN WEBER, deceased (HELENE WEBER, heir) ET AL

It is certified that error appears in the above-identified patent and that said Letters Patent are hereby corrected as shown below:

| Column | Line | Error |
| --- | --- | --- |
| 9 | 69 | "houds" should be ---hours--- |
| 11 | 39 | "fo" should be --- for--- |
| 11 | 47 | "(tetrahydra-1..." should be ---(tetrahydro-1...--- |
| 13 | 28 | "1,1,1-bis" should be --- 1, 1, 1-tris---. |
| 15 | 35 | "(2'cyanothoxy )" should be ---(2'cyanoethoxy)---. |
| 18 | 21 (Claim 8) | "Z' " should be ---$Z_2$--- |
| 18 | 52 (Claim 10) | "cyanoalkyl" should be ---cyanoalkoxy---. |

Signed and sealed this 2nd day of November 1971.

(SEAL)
Attest:

EDWARD M. FLETCHER, JR.
Attesting Officer

ROBERT GOTTSCHALK
Acting Commissioner of Patent